May 26, 1964  O. E. J. THOMAS  3,134,586
DEVICE FOR CHANGING THE SPRING FORCE ACTING ON
A ROTATABLE SYSTEM IN A GAUGE OR THE LIKE
Filed Jan. 11, 1962
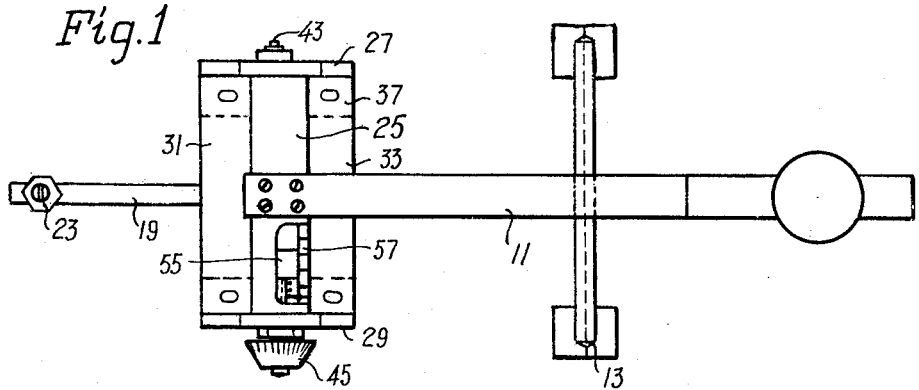
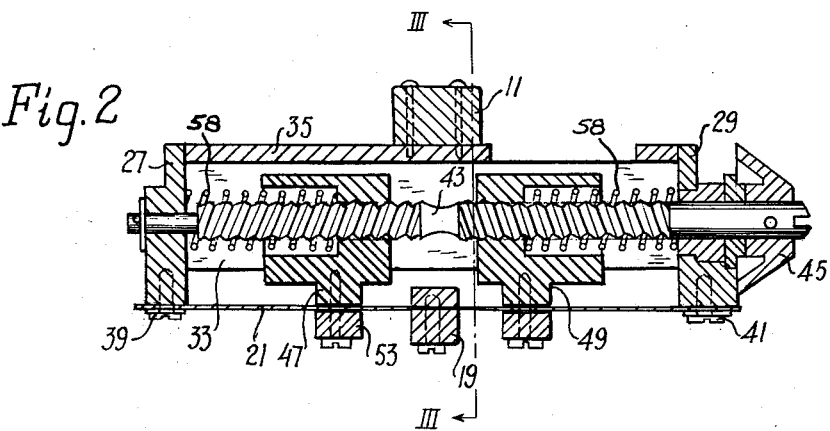
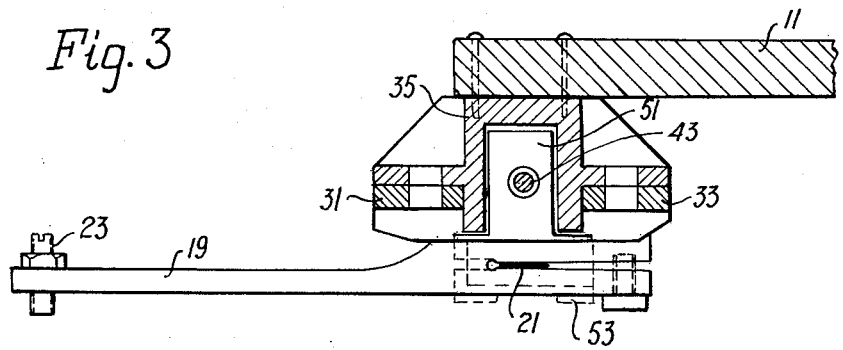

United States Patent Office 3,134,586
Patented May 26, 1964

3,134,586
DEVICE FOR CHANGING THE SPRING FORCE ACTING ON A ROTATABLE SYSTEM IN A GAUGE OR THE LIKE
Otto Erich Joseph Thomas, Munich, Germany, assignor, by mesne assignments, to Regulator AG, Glarus, Switzerland, a corporation of Switzerland
Filed Jan. 11, 1962, Ser. No. 165,608
Claims priority, application Sweden Jan. 16, 1961
9 Claims. (Cl. 267—1)

In certain gauges and similar devices, e.g. controlling devices of various kinds, thermostats etc., in which variable forces which act upon a rotatable system are to be counteracted and balanced by built-in spring forces, there is a desire to be able to vary the spring force in order to balance actuating forces of considerably different magnitudes. This applies especially when the rotatable system consists of a balance arm, the maximum deflection of which from the state of equilibrium is to be kept low.

In order to meet this requirement, it is possible to change between accurately adapted springs or to move the points where the springs act upon the system, in order to get different ranges of sensitivity. Another tried possibility consists of using a spring with a characteristic which is variable in steps or continuously, e.g. a plate spring or a helical spring with a variable active length.

However, a disadvantage of all hitherto known solutions is the fact that it is extremely difficult to re-adjust the spring characteristic without dislocating the state of equilibrium of the rotatable system, especially when this consists of a balance arm which has been carefully adjusted in two planes at right angles to each other, as any interference with the spring changes the state of equilibrium, and requires a careful re-adjustment of the same.

The purpose of the present invention is to eliminate this disadvantage and to make it possible to modify the spring characteristic, without changing the state of equilibrium of the rotatable system. This purpose is achieved according to the main feature of the invention in that a straight, preferably band-shaped torsion spring is fitted to the rotatable system, with its longitudinal direction parallel to the axis of rotation of the system, and in that a clamping device, co-acting with the spring, is movable along the same, in order to change the active length of the spring. A displacement of the clamping device does not involve any dislocation of the state of equilibrium of the rotatable system. According to an embodiment which is especially suitable for use with balance arms, there are two clamping devices which can be moved uniformly and commonly towards or away from each other, whereby they constantly balance each other also in respect of a plane at right angles to the axis of rotation.

In the following, a preferred embodiment of the device according to the invention will be described in more detail with reference to the attached drawings. FIGS. 1, 2 and 3 show details of the spring re-adjusting device viewed from above, in a longitudinal section and in a cross-section along the line III—III, respectively, the latter figures being drawn to a larger scale than FIG. 1.

In FIG. 1, 11 designates a balance arm, which is supported on edges 13, which form a transversal horizontal axis of rotation for the arm. One side of the arm is subjected to a variable force F, arising e.g. from a coil or an iron core in an electrical measuring device, from a membrane system or from a pneumatically or hydraulically actuated spring bellows, and the other side of the arm is subjected to an equally great reaction force from a support which is firmly fixed, i.e. independent of the movement of the arm. The reaction force is transmitted to the arm by means of a lever 19 and a torsion spring 21. One end of the lever 19 rests with an adjusting screw 23 against the support (not shown), and the other end of the lever, which has been made in the form of a clamp, grips the middle of the spring 21. This spring 21 consists of a band made of spring steel, which is set straight in a frame 25, fastened to the balance arm 11, transversal to the same, in such a way that its longitudinal direction is parallel to the axis of oscillation determined by the edges 13 of the balance arm.

The frame 25 (which is only shown schematically in FIG. 1) consists of the ends 27, 29 and the sides 31, 33. The rectangular opening in the frame is covered by a casing 35 of an upside down U-formed cross-section, the ends of which are fastened to the frame by means of protruding ears 37. The spring 21 fastened by the screws 39, 41, as well as a spindle 43 parallel thereto, which is rotatably supported at the ends of the frame but prevented from being displaced axially, extends between the ends 27, 29 of the frame. The spindle 43 can be rotated by means of a graduated knob 45, fastened to its end. The spindle extends through and engages threaded holes in two identical clamping devices 47, 49, each of which comprises a rectangular block 51 which is guided in the U-formed trough of the casing 35 so that it cannot be turned, and a clamp 53 which can be set by screws so as to closely embrace the plate spring 21 and be slidable thereupon. The setting spindle 43 engages one of the clamping devices 47 by means of a left-hand thread, and the other clamping device 49 by means of a right-hand thread of the same pitch, and when the spindle is turned, these clamping devices will, consequently, move symmetrically towards or away from each other on opposite sides of the clamping point of the lever 19. The set or effective length of the torsion spring and, consequently, the characteristic of the spring will then be changed. The clamping devices 47, 49 are the only parts which change positions, and as they retain their distance from the axis of rotation of the balance arm, and also lie at equal distances from a plane running at right angles to the axis of rotation of the balance arm and through the lever 19 while being displaced, their displacement obviously has no effect whatever on the state of equilibrium of the balance arm.

Cylindrical springs 58 surround spindle 43 and are disposed between each side 27, 29 and a recess in each clamping device 47, 49 in order to maintain each clamping device at its adjusted position along spring 21.

The casing 35 has a recess 55 at one end, and in the edge of this a graduated scale 57. By reading off the position of one of the clamping devices on this scale and/or by reading off the position of the knob 45, the desired spring characteristic can be accurately set.

Electrical contacts can be fastened to the balance arm in order to achieve a function of one kind or another when the right-hand side of the balance arm has been depressed by the force F to a certain, usually rather small, angle. As mentioned above, the counteracting spring force can be changed by means of the knob 45; thus, contact action can be made to take place at a greater or lesser force F. Moreover, by setting the adjusting screw 23, a greater or lesser pre-set of the spring 21 can be introduced, so that the balance arm will not be actuated at all by the force F until this exceeds a certain, corresponding value. As an alternative, a pointer can be connected to the rotatable system, to show the turning of the system from a starting position on a fixed dial. By changing the spring constant by means of the knob 45, a pointer indication of a size which can easily be read off can be obtained for actuating forces of different order.

The plate spring used is assumed to have parallel edges, which gives a linear spring characteristic but, as an alternative, the spring can be made in a tapered manner, with straight or curved edges, thereby obtaining other desired, non-linear spring characteristics.

I claim:

1. A device of the type described comprising a first lever, means pivotally mounting said first lever, mounting means connected to one end of said lever, torsion spring means disposed in said mounting means, a second lever having one end connected to said torsion spring means, and clamping means movably mounted on said mounting means on each side of said second lever which engage said torsion spring means therealong to change the active length thereof.

2. A device according to claim 1 wherein said torsion spring means is disposed parallel to the pivotal mounting means of said first lever.

3. A device according to claim 1 wherein said mounting means has disposed therein guide means in which said clamping means are linearly and nonrotatably guided.

4. A device according to claim 1 wherein adjusting means are operatively connected to said clamping means to adjust the position of each clamping means along said torsion spring means uniformly on each side of said second lever.

5. A device according to claim 4 wherein said adjusting means includes a spindle rotatably mounted in said mounting means parallel to said torsion spring means, said spindle having on one side of said second lever left-hand thread means engaging one of said clamping means and on the other side of said second lever right-hand thread means engaging the other clamping means, and means connected to said spindle ot rotate same so that said clamping means are symmetrically moved along said torsion spring means.

6. A device according to claim 5 wherein biasing means are disposed between said mounting means and each clamping means to maintain said clamping means at their adjusted position along said torsion spring means.

7. A device according to claim 1 wherein adjustable means are provided on said second lever to preload said torsion spring means.

8. In a device for changing the characteristic of a spring force acting between two parts of an oscillatory means, torsion spring means carried by one of the parts of said oscillatory means and having its length parallel to the axis of oscillation of said oscillatory means, means mounting the ends of said torsion spring means to said one part, the other of said two parts having one of its ends engaging said torsion spring means at the center portion thereof, and clamping means movably mounted on said one part on each side of the other part, said clamping means being adapted to engage said torsion spring means symmetrically on each side of the other part to change the active length of said torsion spring means.

9. In a device according to claim 8 wherein guiding means are disposed on said one part in which said clamping means are linearly and nonrotatably guided, said guiding means including spindle means mounted on said one part parallel to said torsion spring means and having a right-hand thread engaging one of said clamping means and a left-hand thread engaging the other of said clamping means, and means operatively connected to said spindle means to rotate same.

References Cited in the file of this patent

UNITED STATES PATENTS

| 2,238,380 | Almen | Apr. 15, 1941 |
| 3,022,536 | Floehr | Feb. 27, 1962 |

FOREIGN PATENTS

| 625,864 | Great Britain | July 5, 1949 |